United States Patent [19]

Kojoh et al.

[11] Patent Number: 4,968,464
[45] Date of Patent: Nov. 6, 1990

[54] PROCESS FOR PRODUCING A POROUS RESIN FILM

[75] Inventors: Hisashi Kojoh; Naoya Yamaguchi, both of Yatsushiro; Kazuhiro Tomoda, Hita; Tomoji Mizutani; Yukio Wakuda, both of Yatsushiro, all of Japan

[73] Assignee: Kohjin Co., Ltd., Tokyo, Japan

[21] Appl. No.: 188,566

[22] Filed: Apr. 29, 1988

[30] Foreign Application Priority Data

Apr. 30, 1987 [JP] Japan ................. 62-104524
Dec. 30, 1987 [JP] Japan ................. 62-335186

[51] Int. Cl.$^5$ ............................ B29C 67/20
[52] U.S. Cl. .................. 264/41; 264/210.6; 264/211.18; 264/235.8; 264/288.8; 264/289.3; 264/289.6; 264/290.2
[58] Field of Search ............ 264/154, 288.8, 41, 264/147, 210.6, 211.18, 235.8, 289.3, 289.6, 290.2

[56] References Cited

U.S. PATENT DOCUMENTS

| | | | |
|---|---|---|---|
| 3,855,056 | 12/1974 | Maeda et al. | 264/147 X |
| 4,105,737 | 8/1978 | Suzuki | 264/147 X |
| 4,115,492 | 9/1978 | Mahoney et al. | 264/288.8 X |
| 4,191,719 | 3/1980 | Jack et al. | 264/288.8 X |
| 4,197,148 | 5/1980 | Shinomura | 264/288.8 X |
| 4,255,376 | 3/1981 | Soehngen | 264/154 X |
| 4,563,317 | 1/1986 | Kamei et al. | 264/154 X |
| 4,585,604 | 4/1986 | Okuyama et al. | 264/288.8 X |
| 4,794,128 | 12/1988 | Kawaguchi et al. | 264/288.8 X |

FOREIGN PATENT DOCUMENTS 53-12542 5/1978 Japan .
57-81745 11/1983 Japan .

*Primary Examiner*—Hubert C. Lorin
*Attorney, Agent, or Firm*—Armstrong, Nikaido, Marmelstein, Kubovcik & Murray

[57] ABSTRACT

A process for producing a porous resin film containing a polyolefin resin as a main component, comprising meltinig a mixture of (A) 100 parts by weight of a polyolefin resin, (B) 0 to 50 parts by weight of a polyester-polyether type thermoplastic elastomer, and (C) a thermoplastic polyester resin having an instrinsic viscosity of not more than 0.5, the amount of the component (C) being from 25 to 90 part by weight per 100 parts of the total amount of the component (A) and the component (B), by heating the mixture at a temperature of not less than the melting temperature of the component (C); kneading the mixture at a shear rate of not less than 200/sec. while cooling the mixture to a temperature of not more than the crystallization temperature of the component (C) and not less than the melting temperature of the component (A); subjecting the mixture to film-forming at a temperature of less than the melting temperature of the component (C) and not less than the melting temperature of the component (A) and cooling the resultant rapidly to obtain a non-stretched film; and stretching the non-stretched film in at least one direction. The porous film obtained by the process has an excellent water proof and an excellent water vapor permeability.

6 Claims, No Drawings

PROCESS FOR PRODUCING A POROUS RESIN FILM

BACKGROUND OF THE INVENTION

The present invention relates to a gas permeable porous resin film and a process for producing the same. More particularly, the present invention relates to a polyolefin resin porous film produced by film-forming a mixture of a polyolefin resin with a thermoplastic polyester resin and stretching the film and a process for producing the same.

Heretofore, there have been known various methods for the preparation of a gas permeable porous resin film, including (1) a method wherein a non-porous film is perforated by an electro-discharge treatment, (2) a method wherein a resin containing calcium carbonate particles is formed into a film and then the calcium carbonate particles are dissolved away from the film by an acid treatment to give a porous film, (3) a resin containing particles of an inorganic substance such as calcium carbonate is formed into a film and then the film is stretched uniaxially or biaxially, and (4) two kinds of resins which are less compatible to each other are blended and formed into a film and then the film is stretched uniaxially or biaxially. These methods have been used to produce a water vapor permeable film or a gas permeable film. The method (1) and the method (2) among the above-mentioned methods are undesirable from the standpoint of productivity and the method (3) is widely used.

However, a porous film obtained by stretching a film containing particles of an inorganic substance according to the method (3) is liable to have a high rigidity due to a high rigidity of the filler contained. Further, when the film is crumpled with hands, the filler particles tend to fall off, which causes an uncomfortableness in the use thereof and further become a dust to damage an environmental condition depending upon use of the film. Of course, in the process of the preparation of the film, the environmental condition tends to be worsened due to the dust of the inorganic minute particles. Moreover, a porous film containing particles of calcium carbonate which is generally used as the inorganic filler has a drawback that the water proof thereof is lowered with the lapse of time due to the hydrophilic property of calcium carbonate.

The method (4) in which two kinds of resins which are less compatible with each other are blended and formed into a film, which is proposed in Japanese Examined Patent Publication No. 53-12542 and Japanese Unexamined Patent Publication No. 58-198536, has various drawbacks mentioned below.

The former (Japanese Examined Patent Publication No. 53-12542) discloses a method wherein a mixture of polypropylene with polystyrene, the amount of which is from 0.05 to 10% by weight per the amount of polypropylene, is formed into a film and the film is stretched to obtain a film having voids. However, these voids are not a through hole penetrating through the film along its thickness direction as described in the publication, and therefore the method is not one for producing a gas permeable or water vapor permeable film. When the amount of polystyrene used is more than 10% by weight per the amount of polypropylene, the resulting stretched film has voids penetrating through the film. However, the number of the voids is small and the stretching of the film is difficult.

Further, in the case of a film obtained by a simple method wherein a polyolefin resin as a base resin and a polystyrene resin as an auxiliary resin are blended and the resulting blend is film-formed, the polystyrene resin is not finely divided so that it is difficult to stretch the film and pores formed by stretching the film are course. As a result, only a film having a very poor water proof is obtained. Even if the polystyrene resin is dispersed in a desirable particle form, the formed polystyrene particles are deformed unless the temperature for the film-forming is considered. As a result, the stretching property becomes poor and, even if the film can be stretched, the pore size of the pores formed in the stretched film is so large that the film is poor in water proof or voids are present discontinuously in layers along the thickness direction of the film and not continued so as to form pores penetrating the film, which results in formation of only a film having a poor gas permeability and a poor water vapor permeability.

The latter (Japanese Unexamined Patent Publication No. 58-198536) discloses a method wherein a mixture of a thermoplastic resin (a) and a thermoplastic resin (b) which is less compatible with the resin (a) and has a melting temperature of more than that of the resin (a) by 20° C. or more is melted and kneaded at a temperature of more than the melting temperature of the resin (b) and thereafter film-formed at a temperature of more than the melting temperature of the resin (a) and less than the melting temperature of the resin (b), and the resulting film is stretched at a temperature of less than the melting temperature of the resin (a) to give a water vapor permeable film.

According to the method, the once formed particles of the resin (b) tend to again agglomerate, thereby yielding large particles, so that it is difficult to obtain a film having a good water proof.

An example of the above-mentioned method wherein polyethylene resin or polypropylene resin is used as the resin (a) and a thermoplastic resin such as polyethylene terephthalate or polybutylene terephthalate, which is usually used for the formation of films, is used as the resin (b) will be explained. The usual film stretching temperature is from 60° to 100° C. for a polyethylene film and from 60° to 110° C. for a polypropylene film. The glass transition temperatures of polyethylene terephthalate film and polybutylene telephthalate film are from 60° to 70° C. and from 40° to 60° C., respectively. Even if a mixture of one of the above resins as the resin (a) and one of the above resins as the resin (b) is kneaded under heating and formed into a film wherein the resin (b) is dispersed to become particles having sizes within the optimum particle size range, the particles of the resin (b) are deformed and stretched during the stretching step, when the stretching is conducted at a temperature more than the glass transition temperature of the resin (b) in such a state that the resin (b) is not crystallized. As a result, there occur cases wherein pores are not formed and only a film having a poor gas permeability and a poor water vapor permeability is obtained.

In order to eliminate these drawbacks, an attempt wherein a film is stayed for some time after the film is formed, thereby promoting the crystallization of the resin (b), and thereafter the stretching is conducted has been made. However, such an attempt cannot improve the gas permeability to a sufficient degree, even though it is possible to improve these properties to some extent.

Further, if polyester resin having a small molecular weight is used as the resin (b) in order to attain an easy crystallization of the resin (b), particles of the resin (b) having a large size are formed because the viscosity of the resin (b) becomes excessively low. When a film containing such large particles is stretched, pinholes having a diameter of more than 1 mm are liably formed and the film is apt to be broken. On the other hand, if a resin having a low molecular weight is used as the resin (a), the stretching property is lowered. Thus, both means are impractical.

In the case of biaxially stretching such a non-stretched film as mentioned above, it is necessary to stretch the film in a stretching ratio of not less than 1.5 in each of the longitudinal and transverse directions in order to obtain stably a uniform stretched film. When the stretching ratio is less than 1.5 in each of the longitudinal and transverse directions, non-stretched portions remain to give only an ununiform film having a striped or spotted pattern which results in a poor appearance. Further, there are some problems with respect to the stability of stretching. In particular, in the case of a tubular, biaxial stretching method, it is very difficult to stretch non-stretched film in a stable condition. Further, an ununiform stretching is an undesirable factor against obtaining a film having a desirable gas permeability.

When the stretching ratio is more than 1.5 in each of the longitudinal and transverse directions, it is possible to stretch a non-stretched film stably and uniformly. However, when the non-stretched film is stretched uniformly as described above, a tear strength of the stretched film in the longitudinal direction is remarkably decreased.

Thus, the prior art has a problem that when a non-stretched film is stretched in a low stretching ratio in order to obtain a stretched film having a sufficient tear strength, the stretching is ununiform and, on the other hand, when an attempt for obtaining a film having a good gas permeability by stretching an unstretched film in a high stretching ratio is made, the tear strength is decreased, which is inadequate for some use. There has been a demand for improvement on these points.

It is an object of the present invention to provide a process for producing a porous resin film having an excellent water proof and an excellent water vapor permeability.

Another object of the invention is to provide a porous resin film having an excellent water proof and an excellent water vapor permeability.

Further object of the invention is to provide a process for producing a porous film having a high tear strength in addition to the above-mentioned properties, and to provide the porous film produced by the process.

These and other objects of the present invention will become apparent from the description hereinafter.

SUMMARY OF THE INVENTION

The present invention provides a process for producing a porous resin film comprising melting a mixture of (A) 100 parts by weight of a polyolefin resin, (B) 0 to 50 parts by weight of a polyester-polyether type thermoplastic elastomer, and (C) a thermoplastic polyester resin having an intrinsic viscosity of not more than 0.5, the amount of the component (C) being from 25 to 90 parts by weight per 100 parts of the total amount of the component (A) and the component (B), by heating the mixture at a temperature of not less than the melting temperature of the component (C); kneading the mixture at a shear rate of not less than 200/sec. while cooling the mixture to a temperature of not more than the crystallization temperature of the component (C) and not less than the melting temperature of the component (A); subjecting the mixture to film-forming at a temperature of less than the melting temperature of the component (C) and not less than the melting temperature of the component (A) and cooling the resultant rapidly to obtain a non-stretched film; and stretching the non-stretched film in at least one direction.

According to the process, a porous resin film having an excellent water proof and an excellent water vapor permeability can be obtained.

Further, in the case that the stretched film obtained above is a biaxially stretched film, if desired, the biaxially stretched film is further subjected to a heat relaxation treatment at a temperature of less than the melting temperature of the component (A) so that the film is shrunk to have an area which is not more than 0.9 time the area before the heat relaxation treatment.

The biaxially stretched film subjected to the heat relaxation treatment has a high tear strength in addition to the above-mentioned properties.

DETAILED DESCRIPTION

The polyolefin resin (A) used in the present invention is usual high molecular weight homopolymers or copolymers of olefins for use in films. Examples of the polyolefin resin (A) are, for instance, linear low density polyethylene, high pressure process low density polyethylene, high density polyethylene, polypropylene, polybutylene, ethylene-propylene copolymer, ethylene-vinyl acetate copolymer, ethylene-alkyl (metha)acrylate copolymer resin, ionomer resin, and mixtures of two or more thereof, and other analogous polyolefin resins except the auxiliary resins exemplified later. However, the polyolefin resin (A) is not limited to these examples.

The polyester-polyether type thermoplastic elastomer (B) employed in the present invention is a block copolymer composed predominantly of a polyester block having a high melting temperature and a high degree of crystallization as a hard segment, and a polyether block as a soft segment.

Polyester-polyether type thermoplastic elastomers wherein the polyester block is polybutylene terephthalate and the polyether block is polytetramethylene ether glycol are suitable. The whole or a part of the acid component and/or the whole or a part of the glycol component of the above-mentioned polyester blcok may be replaced by other acid component and/or glycol component, respectively. Also, the above-mentioned polyether block may be replaced by other polyether block. Examples of commercially available elastomers (B) are, for instance, Pelprene (TOYOBO CO.,LTD), Hytrel (Toray Industries, Inc. and Du Pont de Nemours & Co.), GRILUX (DAINIPPON INK AND CHEMICALS, INC.), LOMOD (General Electric Co.) and Arnitel (AKZO N.V.). These names are trademarks. However, the elastomer (B) is not limited to these examples.

The polyester-polyether type thermoplastic elastomer (B) is blended in an amount of 0 to 50 parts by weight per 100 parts by weight of the polyolefin resin (A). The polyester-polyether type elastomer (B) has an affinity to both the polyolefin resin (A) as a matrix phase and the thermoplastic polyester resin (C) as a disperse phase, and has effects of finely dividing the disperse phase and of inhibiting of reagglomeration of the finely divided disperse phase on the basis of enhancement of a mutual interaction between both the resins (A) and (C) which have a great viscosity difference between them.

Owing to the effects of finely dividing the disperse phase and of inhibiting of reagglomeration of that phase, the film can be improved in its appearance and mechanical property.

Further owing to the above effects, the fluctuation of the particle size of the disperse phase can be reduced and the quality of the obtained porous film can be stabilized, even if the intrinsic viscosity of the thermoplastic polyester resin (C) and the condition for kneading the mixture of resins are somewhat varied.

In order to achieve such effects of the elastomer (B) as mentioned above, it is preferable to add the elastomer (B) in an amount of not less than 1 part by weight per 100 parts by weight of the polyolefin resin (A). If the amount of the elastomer (B) is less than 1 part by weight, the effects can be scarcely expected.

On the other hand, it is undesirable to add the elastomer (B) in an amount of more than 50 parts by weight, since the above-mentioned effect (mutual interaction) due to the affinity of the elastomer (B) becomes excessive and gas-passable pores are hardly formed in the resulting film, when the film is stretched.

Examples of the thermoplastic polyester resin (C) employed in the present invention are, for instance, polyethylene terephthalate, polybutylene terephthalate, 1,4-cyclohexane-dimethanol-modified polyethylene terephthalate, copolymer of polyethylene terephthalate with isophthalic acid, and the like.

It is necessary that the thermoplastic polyester resin (C) employed in the present invention has an intrinsic viscosity of not more than 0.5.

A thermoplastic polyester resin having an intrinsic viscosity of more than 0.5 is undesirable, since the crystallization rate is low and the desired degree of crystallinity cannot be attained within a temperature range (not less than melting temperature of the resin (A) and not more than crystallization temperature of the resin (C)) used for film-forming by extrusion. The higher the intrinsic viscosity is, the lower the crystallization rate is, and therefore, means such as elongation of the residence time in the film-forming step and a heat treatment after the film forming are required. However, such means cause heat deterioration and crystallization of the polyolefin resin (A) as the matrix phase, which result in reduction of stretching property and lowering of film properties such as film strength.

Usual thermoplastic polyester resins having a high degree of polymerization (the intrinsic viscosity: not less than 0.6) have a lower glass transition temperature that is lower than the stretching temperature for the polyolefin resin (A), and even if the thermoplastic polyester resin can be dispersed favorably into the polyolefin resin, the resulting particles of the polyester resin are easily deformed during the stretching, and pores cannot be effectively formed.

As the thermoplastic polyester resin (C) having an intrinsic viscosity of not more than 0.5, there can be employed, for instance, a thermoplastic polyester resin having a low degree of polymerization obtained from a step before solid phase polymerization, or a thermoplastic polyester resin having a low degree of polymerization obtained by hydrolysis of a thermoplastic polyester resin having a high degree of polymerization can be employed. In addition, scraps of thermoplastic polyester resin which are produced in various industries can be employed after hydrolysis. The use of the scraps is advantageous from the viewpoint of cost.

A polyester resin olygomer having a degree of polymerization of at least 3 can be used as the thermoplastic polyester resin (C). The thermoplastic polyester resin (C) used in the present invention is intended to include a thermoplastic polyester resin olygomer having such a low degree of polymerization.

It is necessary that the above-mentioned thermoplastic polyester resin (C) is used in an amount of 25 to 90 parts by weight per 100 parts by weight of the total amount of the polyolefin resin (A) and the polyester-polyether type thermoplastic elastomer (B).

In the case that the polyester resin (C) is employed in an amount of less than 25 parts by weight, pores reaching to the surface of the film are not formed and a porous film can be hardly obtained.

On the other hand, in the case that the polyester resin (C) is employed in an amount of more than 90 parts by weight, the probability of reagglomeration of the dispersed particles becomes higher and particles having a large particle size are easy to be formed, which results in the formation of a film having a poor water proof and a poor mechanical property. Further, there occurs a phase inversion phenomenon wherein the polyolefin resin (A) to be a matrix phase is inversed to a disperse phase and the thermoplastic polyester resin (C) to be dispersed is inverted to a matrix phase. The inversion makes the stretching of the resulting film difficult, and even if the film can be stretched, pores are difficult to be formed and a porous film cannot be obtained.

In the present invention, one or more auxiliary resins can be used in addition to the afore-mentioned components. Polyolefins having a more softness than that of the polyolefin resin (A) or having a flowability are suitably used. Examples of the auxiliary resin include liquid or wax-like polybutadiene, liquid polybutene, liquid polyisoprene, and the derivatives thereof, polybutene-1, ethylene-propylene-diene terpolymer, ethylene-propylene random copolymer, ethylene-butene copolymer, and polybutadiene resin. These auxiliary resins are added to the polyolefin resin (A) in order to improve the softness of the porous film. Further, by selectively using an auxiliary resin having an appropriate viscosity, the viscosity of the matrix phase can be changed to adjust the ratio of the viscosity of the matrix to that of the thermoplastic polyester resin (C) in the process of kneading, thereby capable of controlling the size of the dispersed particles of the resin (C), and further the temperature range for the film-forming by extrusion can be changeable.

When the amount of the auxiliary resin added is more than 55 parts by weight, not only the film-forming property but also the stretching property are reduced, which results in failure in an efficient production of a porous film.

In the present invention, if necessary, components other than the afore-mentioned, for instance, finely particulate inorganic substances such as calcium carbonate for the purpose of delustering of the film, usual thermal stabilizer, slipping agent, antiblocking agent, coloring agent, antistatic agent can be used.

The process for preparing the porous film of the present invention is explained below. In order to obtain effectively the porous film, it is necessary to make the thermoplastic polyester resin (C) into minute particles by melting and kneading so that the average particle size is 0.05 to 30 μm, more preferably 0.05 to 20 μm. Furthermore it is necessary that the once formed minute particles of the thermoplastic polyester resin (C) are prevented from deformation in the process of the film-forming by extrusion.

In the case that the average particle size is less than 0.05 μm, it is necessary to increase the stretching ratio in order to attain a gas permeability sufficient for practical use. However, in this case, the resulting film is easy to break. In the case that the average particle size is more than 30 μm, the size of pores formed by stretching becomes larger and the water proof of the film is reduced. In order to solve these problems, stretching in a lower stretching ratio is required, but uniform stretching is difficult in such a lower stretching ratio, which results in failure in the production of a porous film of a good quality.

In order to make the thermoplastic polyester resin (C) into minute particles so that the average particle size is 0.05 to 30 μm, it is necessary that the mixture of the resins is heated up to a temperature of not less than the melting temperature of the thermoplastic polyester resin (C) which will be formed into particles later and the resin (C) is once melted, and thereafter, the mixture is kneaded at a shear rate of not less than 200/sec. while cooling the mixture with a negative temperature gradient to a temperature of not more than the crystallization temperature of the thermoplastic polyester resin (C) and not less than the melting temperature of the polyolefin resin (A). Even if the mixture of the thermoplastic polyester resin (C) and the polyolefin resin (A) is simply melted and kneaded at a temperature of not less than the melting temperature of the thermoplastic polyester resin (C), and then extruded for film-forming, a large portion of the thermoplastic polyester resin (C) which should essentially becomes particles is present locally in the form of block or ribbon in the extrudate. The reason is as follows. Since the melt viscosity of the thermoplastic polyester resin (C) having an intrinsic viscosity of not more than 0.5 is about 0.1 time or less, or in some case, about 0.01 time or less that of the polyolefin resin (A) under the same temperature condition, shearing stress cannot be transferred to the resin (C) in kneading and there occurs a slipping between the resin (A) and the resin (C), which results in a decrease in kneading resistance. As a result, the resin (C) cannot be dispersed in the form of minute particles into the resin (A).

Generally, the thermoplastic polyester resin (C) is melted by heating at a temperature of not less than its melting temperature and when the molten resin (C) is cooled from the state, the solidification and crystallization of the resin (C) begin at a temperature which is 10° to 50° C. lower than the melting temperature, i.e., the crystallization temperature of the resin (C). Even if the resin mixture is melted and kneaded at a temperature of not less than the melting temperature of the thermoplastic polyester resin (C) to obtain uniformly dispersed particles of the resin (C), most of the particles of the resin (C) are in a flowable state at a temperature of more than the crystallization temperature of the resin (C), and large particles are formed due to reagglomeration of the particles and the control of the particle size is difficult.

On the other hand, when the thermoplastic polyester resin (C) is solidified and crystallized at its crystallization temperature, the melt viscosity of the resin (C) extremely increases.

That is, when the mixture of the thermoplastic polyester resin (C) and the polyolefin resin (A) is kneaded while cooling the mixture with a negative temperature gradient from a temperature of not less than the melting temperature of the resin (C) to a temperature of not more than the crystallization temperature of the resin (C) and not less than the melting temperature of the resin (A), there can be obtained a condition that a ratio of the melt viscosity of the resin (C) to that of the resin (A) becomes about 1 within that temperature range. However, as mentioned above, since the melt viscosity of the thermoplastic polyester resin (C) having an intrinsic viscosity of not more than 0.5 has an extremely small melt viscosity, the shear rate of kneading adopted in usual film-forming process using extrusion by means of screw is insufficient to make the resin (C) into dispersed particles having an average particle size of 0.5 to 30 μm. Therefore a shear rate of not less than 200/sec is required to achieve that.

Furthermore, by the action of the polyester-polyether type thermoplastic elastomer (B), the shearing stress of kneading can be more satisfactorily transferred in the mixture, which results in a uniform particle size of dispersed particles of the resin (C). The effect of the combination use of the elastomer (B) is an epoch-making effect, that is, the use of the elastomer (B) makes the particle size distribution narrower and reduces the variation of the film quality due to fluctuation of the kneading condition.

There is a tendency that under the same kneading condition, the more the amount of the elastomer (B) added is, the smaller the size of dispersed particle is. A porous film having a desired average particle size of dispersed particles can be obtained by controlling the kneading condition and the amount of the elastomer (B).

After the mixture of the resins is melted at a temperature of not less than the melting temperature of the thermoplastic polyester resin (C), it is kneaded at a shear rate of not less than 200/sec. while cooling gradually to a temperature within the range between the crystallization temperature of the thermoplastic polyester resin (C) and the melting temperature of the polyolefin resin (A), thereby thoroughly crystallizing the resin (C), and then the mixture is extruded into a film at a temperature of less than the melting temperature of the resin (C) (preferably not more than the crystallization temperature of the resin (C)) and not less than the melting temperature of the resin (A) and the film is cooled to obtain a non-stretched film.

If the mixture of the resins, which has not yet cooled to a temperature of not more than the crystallization temperature of the thermoplastic polyester resin (C) in the kneading step, extruded and formed into a film at a temperature of more than the crystallization temperature of the resin (C), the thermoplastic polyester resin (C) is still in a molten state and has an extremely low melt viscosity, and consequently there occur a deformation of the film due to drawdown and further breaking of film by tension of taking-off in the film-forming step, and a satisfactory non-stretched film cannot be obtained.

Furthermore, even if the film-forming temperature is fixed to a temperature of not more than the crystallization temperature of the thermoplastic polyester resin (C), when the cooling in the kneading step is insufficient and the resin mixture reaches a die where the mixture is subjected to film-forming, in a state that the resin (C) is not thoroughly crystallized, the thermoplastic polyester resin (C) is separated out from the resin mixture and is solidified and accumulated onto the inner wall of the die. In a while the accumulated resin (C) comes off into the resin mixture and is contained as large particles in the resulting film, which interrupts the film-forming procedure and stretching of the film.

The above-mentioned phenomenon is remarkably observed at the maniford of the die in which the flow rate of melt resin is slower.

After the resin mixture is cooled to a temperature of not more than the crystallization temperature of the thermoplastic polyester resin (C) and the resin (C) is once sufficiently crystallized, the film-forming temperature can be a temperature of less than the melting temperature of the thermoplastic polyester resin (C) and more than the crystallization temperature of the resin (C), since the thermoplastic polyester resin (C) is in a solid state and cannot be melted unless the mixture is heated again up to a temperature of not less than the melting temperature of the resin (C). In order to prevent the deformation of the film in the film-forming and stretching steps, however, it is preferable to increase the degree of crystallization of the thermoplastic polyester resin (C) in the disperse phase. Therefore, it is preferable that the resin mixture which has been cooled to a temperature of not more than the crystallization temperature of the resin (C), is extruded and formed into a film without again raising the temperature of the resin mixture up to a temperature of more than the crystallization temperature of the resin (C).

The thus obtained non-stretched film is then stretched in at least one direction in a usual temperature range which varies depending upon the kind of the polyolefin resin (A) used.

The preferable stretching ratio is 1.5 to 10 times the length before stretching in each or both of the longitudinal and transverse directions, or 1.5 to 40 times the area before stretching as an area stretching ratio. The stretching ratio of the film is suitably selected depending on the desired gas permeability, water vapor permeability and water proof of the film. A porous film which has a pore size of less than 0.1 μm is poor in gas permeability and can be utilized only for limited use. A porous film which has a pore size of more than 100 μm is poor in water proof and has a water permeability. Since the porous film used for a paper diaper and the like is desired to have a resistance to water permeability, a pore size of not more than 100 μm is desirable for a porous film for such use.

Generally, a conventional water vapor permeable film containing calcium carbonate as a filler for use in a paper diaper and the like has a tendency to be deteriorated in water proof due to hydrophilic property of the calcium carbonate itself and that of a surface treating agent added to the calcium carbonate, for instance, fatty acids such as stearic acid. Therefore, the pore size of the film is obliged to limited to a smaller size which is usually 0.1 to 10 μm. However, the raw materials used in the present invention are of a lower hydrophilic property and the porous film has an excellent water proof even if the average pore size is comparatively larger. For the reason, an average pore size of up to 100 μm can be allowed. Naturally, the further smaller the pore size is, the more superior the water proof is.

Generally, there is a tendency that the greater the stretching ratio is, the lower the tear strength of the resulting stretched film is. In order to prevent the tear strength of the film from lowering, a smaller stretching ratio may be adopted. The stretched porous film thus obtained may be subjected to a heat fixation treatment by means of the known method in order to remove a natural shrinking property. When the obtained stretched film is a biaxially stretched film, the stretched film is preferably subjected to further a heat relaxation treatment in order to improve the tear strength.

In the present invention, it is necessary that the heat relaxation is carried out within a temperature range of less than the melting temperature of the polyolefin resin (A). If the heat relaxation temperature is not less than the melting temperature of the resin (A), the pores in the film are clogged due to the melting of the resin (A) to deteriorate extremely the gas permeability. The lower limit of the heat relaxation temperature can be a temperature at which the film is shrunk to have an area that is not more than 0.9 time the area before the heat relaxation treatment. In a usual process, a suitable temperature for the heat relaxation treatment is a temperature which is not less than a temperature of about 20° C. lower than the stretching temperature and lower than the melting temperature of the resin (A).

When the area of the film after the heat relaxation treatment is more than 0.9 time the area before the heat relaxation treatment, the tear strength is hardly improved and a greater improvement is not expected. On the other hand, even when the relaxation ratio is greater, for instance, the area after the heat relaxation treatment is about 0.7 time the area before the treatment, the tear strength of the film can be improved by several times the tear strength before the heat relaxation treatment without reducing the flatness of the film.

The porous resin film of the present invention has preferably a water vapor transmission rate of not less than 1,000 g/m$^2$.24 hr. and a resistance to water penetration of not less than 60 cmAq for use in paper diaper, and the like, for which an excellent water proof as well as an excellent water vapor permeability are required.

The instant process is a process for producing a porous resin film having minute pores by heating and melting a mixture of the polyolefin resin (A) and the thermoplastic polyester resin (C) and, if desired, the polyester-polyether type thermoplastic elastomer (B); kneading the mixture while cooling with a negative temperature gradient, thereby forming minute particles of the crystallized resin (C) in the mixture; forming the mixture into a film preferably at a temperature of not more than the crystallization temperature of the resin (C); and stretching the resulting film at a suitable temperature, whereby the matrix resin and the formed particles are separated from each other partially on the boundary between them to form open pores in the film, yielding a porous film having minute pores. Since in the instant process, it is not necessary to add an inorganic minute particles to the thermoplastic resin as in the widely used process for producing a porous film, there is no trouble of scattering of minute particles in the process of milling and molding the inorganic filler. Since each of the dispersed particles in the porous film is partially adhered to the polyolefin resin as the matrix phase, the particles do not tend to fall off when the film is crumpled with hands, and thus the film is excellent in its usability.

The process of the present invention is an epoch-making process wherein fluctuation in the film properties and trouble in the process of production are removed by adopting the specified kneading condition and preferably using the third resin having a mutual interaction to both of two kinds of resins, in the process for the production of a porous film wherein there are used the two kinds of resins which are less compatible to each other and have a great viscosity difference therebetween. Furthermore, since the materials used in the present invention have a low hydrophilic property, a porous film which is excellent in water proof as well as gas permeability and water vapor permeability can be obtained.

The present invention is more specifically described and explained by means of the following Examples. It is to be understood that the present invention is not limited to the Examples, and various change and modification may be made in the invention without departing from the spirit and scope thereof.

Methods of the measurements in the Examples are shown below.

(1) Melting temperature:
   The value was measured by means of a differential scanning calotimeter (DSC 200 made by SEIKO INSTRUMENTS & ELECTRONICS LTD.) at a temperature increasing rate of 10° C./minute.

(2) Crystallization temperature:
   The crystallization temperature is defined as the temperature corresponding to an exothermic peak due to crystallization which appears when a sample which is allowed to stand at 290° C. for 10 minutes after being melted is cooled at a temperature decreasing rate of 5° C./minute. The value was measured by means of the above-mentioned device.

(3) Intrinsic viscosity:
   The value was measured at 30° C. by a usual method using a mixed solvent of phenol and tetrachroloethane (60/40 by weight).

(4) Water vapor transmission rate: according to JIS Z 0208

(5) Resistance to water penetration: according to the hydrostatic pressure method provided in JIS L 1092

(6) Gas permeability: according to JIS P 8117

(7) Tear strength: according to JIS P 8116

EXAMPLE 1

With 100 parts by weight of a linear low density polyethylene (melting temperature: 120° C.) were dry-blended 60 parts by weight of a polyethylene terephthalate (melting temperature: 259° C., crystallization temperature: 215° C.) having an intrinsic viscosity of 0.35 and 10 parts by weight of a polyester-polyether type thermoplastic elastomer (Pelprene P-40H). The mixture was heated up to 270° C. and melted, and immediately thereafter, the mixture was kneaded at a shear rate of 400/sec. while cooling with a negative temperature gradient from 270° C. to 200° C. The resin mixture was extruded with keeping the temperature of the mixture at 200° C., yielding a non-stretched film, and the film was uniaxially stretched in a stretching ratio of 5.5 at 80° C. by means of a roll stretching machine to obtain a porous film having a thickness of about 40 μm. The obtained film was observed by means of a scanning electron microscope, and it was found that the average particle size of particles dispersed in the film was about 6 μm and the average pore size of pores was about 30 μm in the machine direction.

The obtained film had a water vapor transmission rate of 3,500 g/m².24 hours, a resistance to water penetration of 160 cmAg and a gas transmission rate of 2,560 ml/m².sec.

The above-mentioned porous film was further subjected to a heat relaxation treatment at 100° C. by means of hot rolls. The film was heat-relaxed so that the film was shrunk by 30% in the longitudinal direction. In that case, the film was elongated by 1% in the transverse direction. The tear strength in the longitudinal direction of the thus treated film and that of the film before the treatment were 12 g and 10 g, respectively, and the uniaxially stretched film was not markedly improved in tear strength. The water vapor transmission rate of the treated film was 3,250 g/m².24 hours.

EXAMPLE 2

With 100 parts by weight of a linear low density polyethylene (melting temperature: 120° C.) were dry-blended 65 parts by weight of a polyethylene terephthalate (melting temperature: 257° C., crystallization temperature: 215° C.) having an intrinsic viscosity of 0.26 and 6 parts by weight of a polyesterpolyether type thermoplastic elastomer (Hytrel 4047). The mixture was heated and melted in the same manner as in Example 1 and immediately thereafter the mixture was kneaded at a shear rate of 500/sec. while cooling with a negative temperature gradient from 270° C. to 190° C. In that case, 15 parts by weight, on the basis of 100 parts by weight of the linear low density polyethylene, of a liquid hydrogenated polyisoprene having a molecular weight of 25,000 and a degree of hydrogenation of 90% by mole was added to the mixture on the way of the kneading and kneaded. After kneading, the mixture kept at 190° C. was extruded from a circular die to obtain a non-stretched tubular film. The obtained film was introduced into a tubular type biaxial stretching machine and stretched simultaneously and biaxially at 80° C. in stretching ratios of 3.3 and 2.5 in the longitudinal and transverse directions, respectively, to obtain a porous film having a thickness of about 40 μm. The obtained film was observed by means of a scanning electron microscope, and it was found that the average particle size of the particles dispersed in the film was about 7 μ m and the average pore size of the pores was about 15 μ m. The film had a water vapor transmission rate of 5,700 g/m².24 hours, a gas transmission rate of 7,600 ml/m².sec. and a resistance to water penetration of 130 cmAq. The film was a white film of fine texture and having balanced properties in both the longitudinal and transverse directions. The tear strength in the longitudinal direction of the simultaneously, biaxially stretched film was 21 g.

The film was cut open to obtain a flat film. The flat film was subjected to a heat relaxation treatment by running it from a pair of hot rolls having a peripheral speed of 10 m/minute and a surface temperature of 98° C. to a pair of hot rolls having a peripheral speed of 7.5 m/minute and having a surface temperature of 98° C. so that the film was shrunk by 25% in the longitudinal direction, and thereafter cooled. In that case, the film was shrunk by 14% in the transverse direction.

The tear strength in the longitudinal direction of the heat relaxed film was 82 g, which was remarkably improved in comparison with that of the film before the heat relaxation.

Separately, the biaxially stretched film was subjected to a heat-treatment under the same condition as in the above heat relaxation treatment except that the peripheral speed (7.5 m/minute) of the rear hot rolls was changed to 10 m/minute, whereby the film was shrunk by 3% in the transverse direction. The tear strength in the longitudinal direction of the obtained film was 23 g, which was slightly improved in comparison with that of the film before the heat treatment.

EXAMPLE 3

With 100 parts by weight of a high pressure process low density polyethylene (melting temperature: 110° C.) were dry-blended 60 parts by weight of a polybutylene terephthalate (melting temperature: 224° C., crystallization temperature: 212° C.) having an intrinsic viscosity of 0.35, 5 parts by weight of a polyester-polyether type thermoplastic elastomer (Pelprene P-30B) and 10 parts by weight of polybutene-1 (melting temperature: 125° C., MI: 2.0). The mixture was heated up to 240° C. and melted, and immediately thereafter, the mixture was kneaded at a shear rate of 400/sec. while cooling with a negative temperature gradient so that the temperature of the mixture fell to 175° C. in the extrusion part, and then extruded at 175° C. and the extrudate was quenched to obtain a non-stretched film. The resulting film was uniaxially stretched in a stretching ratio of 5 at 80° C. by means of a roll stretching machine. With respect to the obtained porous film, the average particle size of the dispersed particles was about 7 μm and the average pore size of the pores in the machine direction was about 30 μm. The film had a water vapor transmission rate of 3,400 g/m$^2$.24 hours, a resistance to water penetration of 155 cmAq., and a gas transmission rate of 2,500 ml/m$^2$.sec., which showed that the film was excellent in gas permeability, water vapor permeability and resistance to water penetration.

EXAMPLE 4

With 100 parts by weight of a linear low density polyethylene (melting temperature: 120° C.) was dry-blended 50 parts by weight of a polyethylene terephthalate (melting temperature: 259° C., crystallization temperature: 215° C.) having an intrinsic viscosity of 0.3. The mixture was heated up to 270° C. and melted, and immediately thereafter, the mixture was kneaded at a shear rate of 380/sec. with cooling with a negative temperature gradient from 270° C. to 200° C. The mixture was extruded with keeping the temperature thereof at 200° C. to give a non-stretched film and then the film was uniaxially stretched in a stretching ratio of 6 at 80° C. by means of a roll stretching machine to obtain a water vapor permeable and water proof film having a thickness of about 40 μm.

The obtained film was observed by means of a scanning electron microscope, and it was found that the average particle size of the particles dispersed in the film was about 15 μm and the average pore size of the pores in the machine direction was about 50 μm.

The film had a water vapor transmission rate of 3,200 g/m$^2$.24 hours, a resistance to water penetration of 110 cmAq and a gas transmission rate of 2,300 ml/m$^2$.sec.

EXAMPLE 5

With 100 parts by weight of a propylene homopolymer (melting temperature: 170° C.) were dry-blended 60 parts by weight of a polyethylene terephthalate (melting temperature: 259° C., crystallization temperature: 215° C.) having an intrinsic viscosity of 0.35 and 10 parts by weight of a polyester-polyether type thermoplastic elastomer (Pelprene P-40H). The mixture was heated up to 270° C. and melted, and thereafter the mixture was kneaded at a shear rate of 1,000/sec. with cooling with a negative temperature gradient from 270° C. to 200° C. The mixture was extruded with keeping the temperature thereof at 200° C. to give a non-stretched film, and the film was uniaxially stretched in a stretching ratio of 5.5 at 85° C. by means of a roll stretching machine to obtain a porous film having a thickness of about 40 μm. With respect to the obtained porous film, the particle size was about 5 μm and the average pore size was about 25 μm. The film had a water vapor transmission rate of 2,800 g/m$^2$.24 hours, a gas transmission rate of 2,230 ml/m$^2$.sec. and a resistance to water penetration of 157 cmAq, which showed that the film was an excellent porous film.

EXAMPLE 6

With 100 parts by weight of a propylene random copolymer (melting temperature: 140° C.) containing 96.5% by weight of propylene and 3.5% by weight of ethylene were dry-blended 65 parts by weight of a polyethylene terephthalate (melting temperature: 257° C., crystallization temperature: 215° C.) having an intrinsic viscosity of 0.26 and 5 parts by weight of a polyester-polyether type thermoplastic elastomer (pelprene P-40H) The mixture was heated up to 270° C. and melted and immediately thereafter, the mixture was kneaded at a shear rate of 450/sec. with cooling with a negative temperature gradient from 270° C. to 200° C. The mixture was extruded with keeping the temperature thereof at 200° C. to give a non-stretched tubular film. The film was introduced into a biaxial stretching machine made by Kabushiki Kaisha Iwamoto Seisakusho and simultaneously and biaxialy stretched at 80° C. in stretching ratios of 3 and 2.5 in the longitudinal and transverse direction to obtain a porous film having a thickness of about 40 μm.

With respect to the obtained porous film, the average particle size was about 7 μm and the average pore size was about 17 μm. The film had a water vapor transmission rate of 4,200 g/m$^2$.24 hours, a gas transmission rate of 3,300 ml/m$^2$.sec. and a resistance to water penetration of 170 cmAg, which showed that the film was an excellent porous film.

COMPARATIVE EXAMPLE

The same procedures as in Example 1 were repeated except that the amount (10 parts by weight) of the polyester-polyether type thermoplastic elastomer (pelprene P-40H) was changed to 60 parts by weight to obtain a non-stretched film. The film was stretched in the same manner as in Example 1. In that case, there occurred a necking phenomenon, which made difficult uniform stretching of the film.

The stretched film was observed by means of a scanning electron microscope, and it was found that the boundary between each of the dispersed particles and the matrix resin was unclear and the number of the pores was small. The water vapor transmission rate and the gas transmission rate of the film are so small as to be 890 g/m$^2$.24 hours and 96 ml/m$^2$.sec., respectively.

COMPARATIVE EXAMPLE 2

With 100 parts by weight of a linear low density polyethylene (melting temperature: 120° C.) were dry-blended 55 parts by weight of a polyethylene terephthalate (melting temperature: 259° C., crystallization temperature: 185° C.) having an intrinsic viscosity of 0.71 and 5 parts by weight of a polyester-polyether type thermoplastic elastomer (pelprene P-30B). The mixture was heated up to 270° C. and melted and thereafter it was extruded in such a condition that the temperature of the mixture immediately after it came out from the die was 230° C., yielding a non-stretched film. The particle size of dispersed particles in the film was more than several hundreds microns. When the film was stretched, many pin holes having diameters of several millimeters occurred.

COMPARATIVE EXAMPLE 3

The same procedures as in Example 1 were repeated except that the same resin mixture as used in Example 2 was used and the lowest temperature (200° C.) in the kneading step was changed to 170° C. to obtain a non-stretched film. The average particle size of the dispersed particles was so small as to be about 8 μm. However, the film which was stretched in the same manner as in Example 1 had a small water vapor transmission rate of 650 g/m².24 hours. The film was observed by means of a scanning electron microscope and it was found that the dispersed particles were deformed and the number of the pores was very small.

COMPARATIVE EXAMPLE 4

The same procedures as in Example 1 were repeated except that the lowest temperature (200° C.) in the kneading step was changed to 230° C. In the film-forming step, however, there occurred often breaking of film due to drawdown and even a non-stretched film could not be obtained.

COMPARATIVE EXAMPLE 5

The same procedures as in Example 1 were repeated except that the shear rate in the kneading step was changed to 180/sec. to give a non-stretched film. The average particle size of the dispersed particles in the film was about 100 μm, and when the film was stretched, there occurred many pin holes having diameters of slightly less than 1 mm.

COMPARATIVE EXAMPLE 6 and 7

A polyethylene terephthalate (melting temperature: 258° C., crystallization temperature: 225° C.) having an intrinsic viscosity of 0.31 was blended with 100 parts by weight of a linear low density polyethylene (melting temperature: 120° C.) in amounts of 20 parts by weight (Comparative Example 6) and 95 parts by weight (Comparative Example 7), respectively, yielding two kinds of resin mixtures. Each of the mixtures was treated in the same manner as in Example 4 to obtain two kinds of non-stretched films.

The former film (Comparative Example 6) had dispersed particles having an average particle size of about 14 μm that seemed to be acceptable, but the stretched film obtained therefrom in the same manner as in Example 4 had a small water vapor transmission rate of 300 g/m².24 hours and a small gas transmission rate of 16 ml/m².sec. The latter film (Comparative Example 7) had dispersed particles having a large average particle size of about 40 μm, and when the film was stretched, there occurred many pin holes having diameters of several millimeters. Thus both films could not have satisfactory water vapor permeability and water proof.

In addition to the ingredients used in the Examples, other ingredients can be used in the Examples as set forth in the specification to obtain substantially the same results.

What is claimed is:

1. A process for producing a porous resin film comprising the steps of: melting a mixture of (A) 100 parts by weight of a polyolefin resin, (B) 0 to 50 parts by weight of a polyester-polyether type thermoplastic elastomer, and (C) a thermoplastic polyester resin having an intrinsic viscosity of not more than 0.5, the amount of the component (C) being from 25 to 90 parts by weight per 100 parts of the total amount of the component (A) and the component (B), by heating the mixture at a temperature of not less than the melting temperature of the component (C); kneading the mixture at a shear rate of not less than 200/sec. while cooling the mixture to a temperature of not more than the crystallization temperature of the component (C) and not less than the melting temperature of the component (A); subjecting the mixture to film-forming at a temperature of less than the melting temperature of the component (C) and not less than the melting temperature of the component (A) and cooling the resultant rapidly to obtain a non-stretched film; and stretching the non-stretched film in at least one direction.

2. The process of claim 1, in which the non-stretched film is stretched in a stretching ratio of not less than 1.5 in each of the longitudinal and transverse directions to give a biaxially stretched film.

3. The process of claim 2, in which the biaxially stretched film is further subjected to a heat relaxation treatment at a temperature of less than the melting temperature of the component (A) so that the film is shrunk to have an area which is not more than 0.9 time the area before the heat relaxation treatment.

4. The process of claim 3, in which the heat relaxation treatment is carried out by passing the film through a pair of hot rolls and another pair of hot rolls.

5. The process of claim 1, in which the amount of the component (B) is from 1 to 50 parts by weight.

6. The process of claim 1, in which the amount of the component (B) is from 5 to 50 parts by weight.

* * * * *

UNITED STATES PATENT AND TRADEMARK OFFICE
CERTIFICATE OF CORRECTION

PATENT NO. : 4,968,464
DATED : November 6, 1990
INVENTOR(S) : Hisashi Kojoh et al It is certified that error appears in the above-identified patent and that said Letters Patent is hereby corrected as shown below:

On the title page, Itme [30], "62-335186" should read --62-335184--.

Signed and Sealed this

Twenty-first Day of April, 1992

Attest:

HARRY F. MANBECK, JR.

*Attesting Officer*          Commissioner of Patents and Trademarks